(12) United States Patent
Horváth et al.

(10) Patent No.: US 10,153,909 B2
(45) Date of Patent: Dec. 11, 2018

(54) POWER OVER ETHERNET POWERED DEVICE CONFIGURED FOR LOW DUTY-CYCLE OPERATION

(71) Applicant: Silicon Laboratories Inc., Austin, TX (US)

(72) Inventors: Vince András Horváth, Budapest (HU); Tamás Marozsák, Budapest (HU); Péter Onódy, Budapest (HU); John Gammel, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 558 days.

(21) Appl. No.: 14/791,969

(22) Filed: Jul. 6, 2015

(65) Prior Publication Data
US 2017/0012787 A1    Jan. 12, 2017

(51) Int. Cl.
H04L 12/10    (2006.01)
H04L 12/40    (2006.01)

(52) U.S. Cl.
CPC ........ H04L 12/10 (2013.01); H04L 12/40045 (2013.01)

(58) Field of Classification Search
CPC ... H04L 12/10; H04L 12/40045; G06F 1/266; G06F 1/26; G06F 1/32; G05F 3/02
See application file for complete search history.

(56) References Cited

U.S. PATENT DOCUMENTS

| | | |
|---|---|---|
| 7,281,141 B2 | 10/2007 | Elkayam et al. |
| 7,368,798 B2 | 5/2008 | Camagna et al. |
| 7,469,348 B2 | 12/2008 | Camagna et al. |
| 7,500,116 B2 | 3/2009 | Camagna et al. |
| 7,620,825 B2 | 11/2009 | Camagna et al. |
| 7,685,452 B2 | 3/2010 | Camagna et al. |
| 7,761,719 B2 | 7/2010 | Ghoshal et al. |
| 7,814,357 B2 | 10/2010 | Koper et al. |
| 7,873,057 B2 | 1/2011 | Robitaille et al. |
| 7,877,621 B2 | 1/2011 | Jacoby et al. |
| 8,014,412 B2 | 9/2011 | Herbold |
| 8,581,438 B2 | 11/2013 | Heath et al. |
| 8,674,546 B1 | 3/2014 | Dix et al. |
| 8,705,341 B2 | 4/2014 | Robitaille et al. |
| 8,873,370 B2 | 10/2014 | Robitaille et al. |
| 2007/0041577 A1 | 2/2007 | Ghoshal et al. |
| 2007/0208961 A1 | 9/2007 | Ghoshal et al. |
| 2008/0276111 A1 | 11/2008 | Jacoby et al. |
| 2009/0265563 A1 | 10/2009 | Camagna et al. |
| 2011/0125341 A1 | 5/2011 | Heath et al. |

(Continued)

OTHER PUBLICATIONS

Guo et al., "TPS23752 Maintain Power Signature in Operation in Sleep Mode", Application Report SLVA588, Texas Instruments, Apr. 2013.*

(Continued)

*Primary Examiner* — Ryan Johnson

(74) *Attorney, Agent, or Firm* — Cesari & Reed, LLP; R. Michael Reed

(57) ABSTRACT

In some embodiments, a powered device includes a powered device circuit, which may include a maintain power signature (MPS) circuit configured to compare a sense current to a reference current. In a first mode, the MPS circuit may be configured to automatically generate an MPS signal when the sense current is less than the reference current.

12 Claims, 7 Drawing Sheets

(56) References Cited

U.S. PATENT DOCUMENTS

| | | |
|---|---|---|
| 2012/0218879 A1 | 8/2012 | Robitaille et al. |
| 2012/0303981 A1 | 11/2012 | Heath et al. |
| 2013/0154603 A1* | 6/2013 | Cerutti .................. G05F 3/02 |
| | | 323/312 |
| 2014/0084681 A1 | 3/2014 | Vigna et al. |
| 2014/0084691 A1 | 3/2014 | Ranzato et al. |
| 2016/0095175 A1* | 3/2016 | Picard ................ H05B 33/089 |
| | | 315/294 |

OTHER PUBLICATIONS

Wright, TPS23752EVM-Low Cost, Jun. 22,2013, Texas Instruments Incorporated, Texas, US, 3 pages.

EVALPM8803-FWD: IEEE802.3at compliant demonstration kit with synchronous active clamp forward PoE converter, Jun. 2011,STMicroelectronics, 6 pages.

Compact, high efficiency,30 W Reference platform with the NCP1081 Evaluation Board User's Manual, Semiconductor Components Industries, LLC, Publication Order No. EVBUM2028/D, Dec. 2011, 6 pages.

IEEE 802.3af-Compliant, High Efficiency, Class 1/Class 2, Powered Devices with integrated DC-DC Converter, Maxim Integrated Products, Inc., Jan. 2015, 22 pages.

High Power/High Efficiency PoE Interface and DC/DC Controller, Texas Instruments Incorporated, Oct. 2013, Texas, US, 45 pages.

* cited by examiner

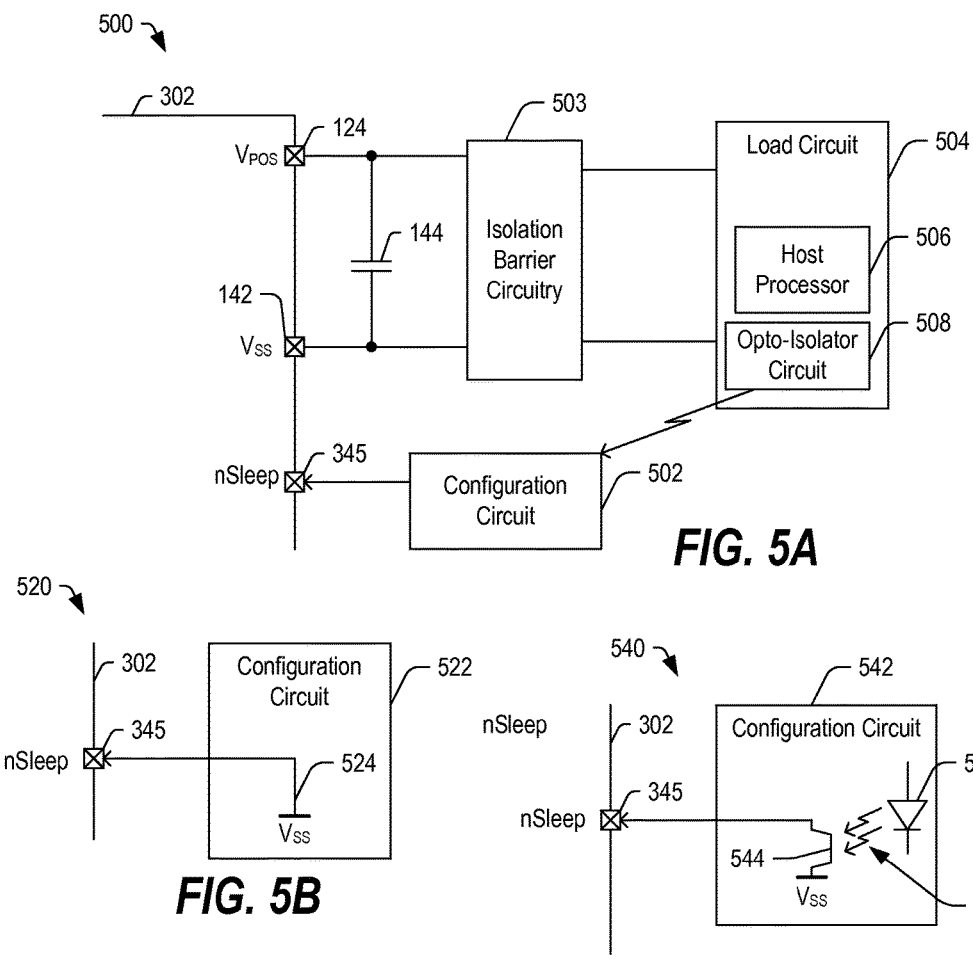
FIG. 5A
FIG. 5B
FIG. 5C
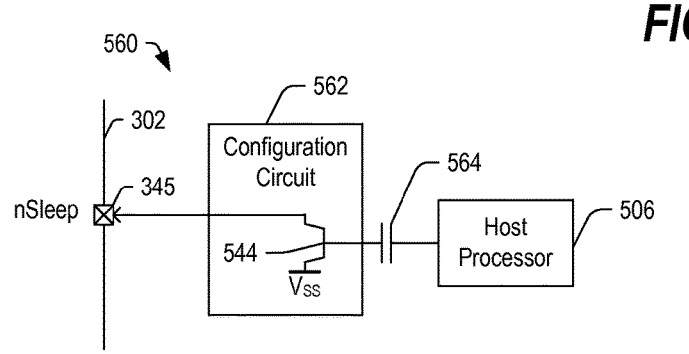
FIG. 5D

POWER OVER ETHERNET POWERED DEVICE CONFIGURED FOR LOW DUTY-CYCLE OPERATION

FIELD

The present disclosure is generally related to Power over Ethernet powered devices (PDs), and more particularly to PDs configured for low duty-cycle operation.

BACKGROUND

Power over Ethernet (POE) powered devices (PDs) receive power and data from a power sourcing equipment (PSE) device through Ethernet cables. The Institute of Electrical and Electronics Engineers (IEEE) defined a collection of standards defining the physical layer and data link layer's media access control of wired Ethernet, which standards may be referred to as IEEE 802.3. The POE standards were defined as a subsection within the IEEE 802.3 standard. IEEE 802.3af standard defines a POE standard wherein the PSE device provides a maximum continuous power per cable of approximately 15.4 Watts. The IEEE 802.3at standard specifies that the PSE may provide a maximum continuous power output of approximately 25.5 Watts.

In operation, the PSE device may detect a maintain power signature (MPS) to determine if a PD is connected and continues to require power, in accordance with the IEEE 802.3 of/at Standard. For the PSE device to detect the MPS, the PD may periodically draw power of approximately 10 mA. If the PSE device does not detect at least a 10 mA current for a period of time, the PSE may disconnect power to the PD.

SUMMARY

In some embodiments, a powered device includes a powered device circuit. The powered device circuit may include a maintain power signature (MPS) circuit configured to compare a sense current to a reference current and, in a first mode, to automatically generate an MPS signal when the sense current is less than the reference current.

In other embodiments, a method may include determining a power consumption state of a direct-current (DC) to DC converter. The method may further include disabling generation of a maintain power signature (MPS) signal when the power consumption state corresponds to high power consumption. Further, the method may include selectively providing the MPS signal to a power supply node in response to a configuration state of an MPS circuit when the power consumption state corresponds to low power consumption In still other embodiments, a powered device may include a powered device circuit and a bypass transistor. The powered device circuit may include a low consumption detector circuit configured to compare a sense current to a threshold current and to detect low power consumption when the current is less than the threshold. The powered device circuit may also include a maintain power signature (MPS) control circuit coupled to the low consumption detector and configured to selectively generate an MPS signal in response to detecting the low power consumption. The bypass transistor may be configured to shunt the low consumption detector circuit when the powered device is in a high power consumption mode.

BRIEF DESCRIPTION OF THE DRAWINGS

FIG. 5A is a diagram of a portion of the circuit of the PD device including a configuration circuit coupled to a configuration node to configure generation of a maintain power signature signal, in accordance with certain embodiments of the present disclosure.

FIG. 5B is a diagram of the portion of the circuit of FIG. 5A including the configuration node configured for automatic generation of the maintain power signature signal, in accordance with certain embodiments of the present disclosure.

FIG. 5C is a diagram of the portion of the circuit of FIG. 5A including the configuration node configured for selective generation of the maintain power signature signal, in accordance with certain embodiments of the present disclosure.

FIG. 5D is a diagram of the portion of the circuit of FIG. 5A configured for selective generation of the maintain power signature signal, in accordance with certain embodiments of the present disclosure.

In the following discussion, the same reference numerals are reused in the various figures to indicate the same or similar elements.

DETAILED DESCRIPTION OF ILLUSTRATIVE EMBODIMENTS

Applications operating in low duty cycle mode may have dynamically changing power consumption. During a period of high power consumption, very low additional series impedances are needed to keep high efficiency. On the contrary, in periods of low power consumption, a sufficiently high impedance sense resistor may be used to detect whether or not the MPS pulse generation is needed.

In a POE system that complies with the IEEE 802.3af/at POE standard, the PSE device may detect a maintain power signature (MPS) to determine if a PD continues to require power. The MPS signal may include a current of at least some milliamperes, such as 10 mA. To comply with the above-identified POE standard, the PD produces the MPS signal periodically provide a return current of at least 10 mA and, if the MPS signal is not present for a period of time, the PSE may disconnect power to the PD.

Embodiments of PDs are described below that, in a low duty-cycle mode or low power consumption mode, may produce the MPS signal automatically (in a first mode) or selectively in response to a control signal from a host processor or other control device (in a second mode). During high power consumption periods of operation, very low impedances can be used to maintain high efficiency. In low power periods of operation, a sufficiently high series current sense resistor may be used to detect whether or not the MPS signal generation should be generated. In a low duty-cycle mode, applications may continue to operate and may cause dynamically changing power consumption.

Embodiments of circuits and methods are described below that may include an external bypass transistor, which may be activated to shunt the relatively high impedance sense circuitry of the internal hot-swap switch, when the PD is operating in a high power mode. In a low power mode, the external bypass transistor may be turned off to allow the internal hot-swap switch circuitry to measure the current consumption using the relatively high impedance sense circuitry (e.g., a relatively large sense resistor). The PD circuitry may provide high efficiency operation in the high power mode while allowing for low current detection for MPS signal generation in a low duty-cycle or low power mode. An embodiment of a POE system is described below with respect to FIG. 1, which system may include a PD configured to selectively produce an MPS signal when in a low duty-cycle or low power mode.

Figure 1:
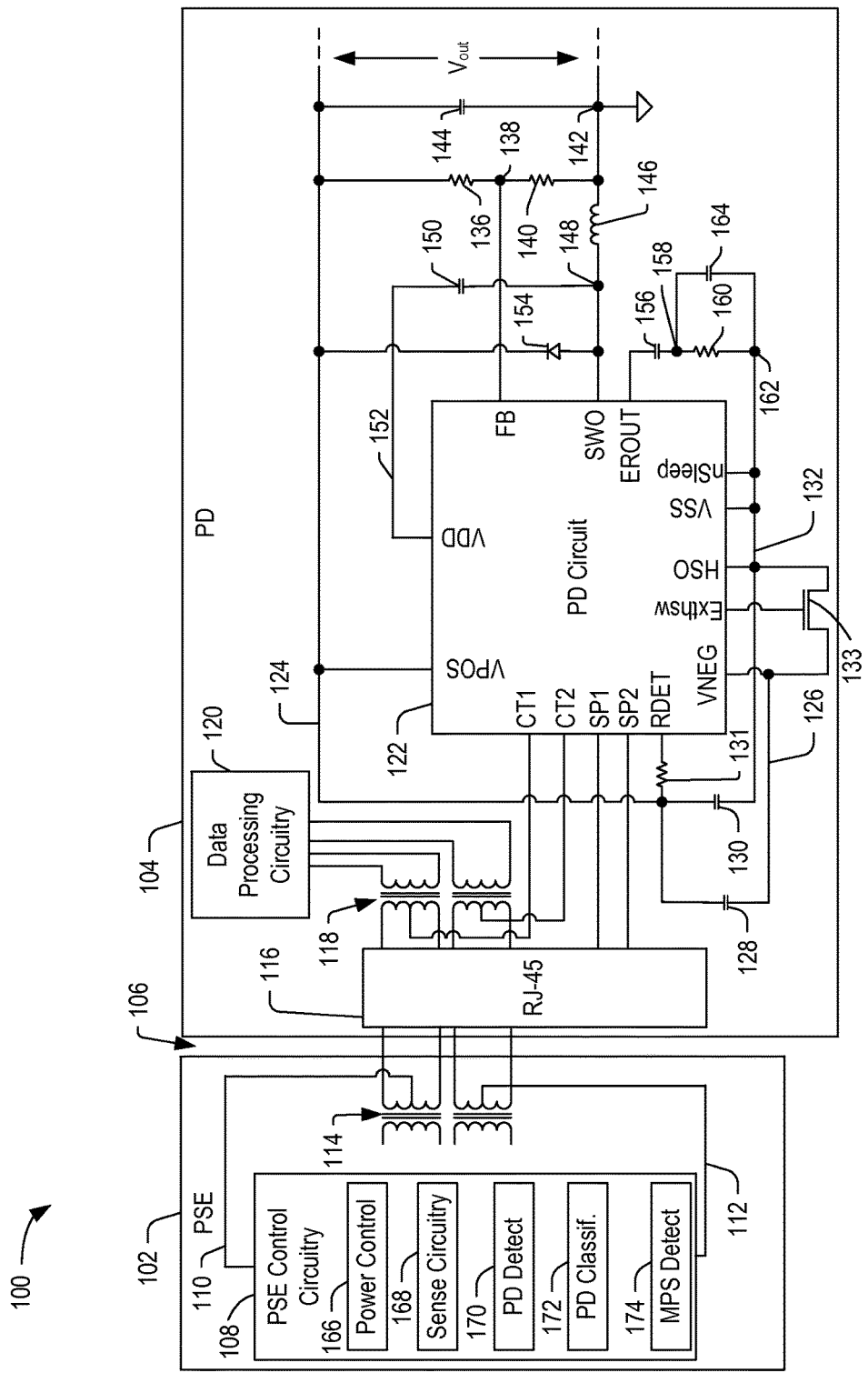
FIG. 1 is a partial block diagram and partial circuit diagram of a Power over Ethernet (POE) system including a powered device (PD) configured for low duty-cycle operation, in accordance with certain embodiments of the present disclosure.

FIG. 1 is a partial block diagram and partial circuit diagram of a Power over Ethernet (POE) system 100 including a powered device (PD) 104 configured for low duty-cycle operation, in accordance with certain embodiments of the present disclosure. The POE system 100 may include a power sourcing equipment (PSE) device 102, which may be coupled to the PD device 104 though twisted pair (Ethernet) cabling 106. The PSE device 102 may include PSE control circuitry 108, which may be coupled between a first node 110 and a second node 112. The first node 110 may be coupled to a center tap of a first transformer of a transformer pair 114, and the second node 112 may be coupled to a center tap of the second transformer of the transformer pair 114. The transformer pair 114 may inject power onto selected wires of the twisted pair cabling 106.

The PSE control circuitry 108 may be coupled to a power supply (not shown) and to other circuitry to provide a functional PSE device 102. Further, the PSE control circuitry 108 may include power control circuitry 166, which may be configured to selectively deliver power to the nodes 110 and 112. The PSE control circuitry 108 may include PD detect circuitry 170 that may be configured to perform POE powered device (PD) detection operations, in conjunction with the power control circuitry 166, to apply a PD detection signal to the twisted pair cabling 106 in accordance with the IEEE POE standard. The PSE control circuitry 108 may also include sense circuitry 168 configured to detect a PD detection signature in response to the PD detection signal. The PSE control circuitry 108 may further include PD classification circuitry 172 configured to cooperate with the power control circuitry 166 to provide a PD classification signal to the twisted pair cabling 106 and to determine a power classification of the PD device 104 based on a PD classification signature detected by the sense circuitry 168. The power control circuitry 166 may supply power to the PD 104 according to the power classification determined from the PD classification signature. The PD detection signature and the PD classification signature (and associated power requirements) are defined in the IEEE POE standard.

The PSE control circuitry 108 may further include MPS detection circuitry 174. The MPS detection circuitry 174 may be configured to monitor the nodes 110 and 112 to detect an MPS signal during periods of low power consumption by the PD 104. If the MPS signal is not detected within a period of time, the PSE control circuitry 108 may turn off power to the PD 104.

The PD 104 may include an interface (such as an RJ-45 connector 116), which may be configured to couple to the twisted pair cabling 106 and which may be coupled to transformer circuitry 118. The transformer circuitry 118 may provide data from the twisted pair lines to data processing circuitry 120. Further, center taps of the transformer circuitry 118 may be coupled to center tap nodes (CT1 and CT2) of a PD circuit 122. The PD circuit may include high-voltage supply input nodes (SP1 and SP2), which may be coupled to a spare wire pair of the RJ-45 connector 116 and which may be polarity-insensitive. Further, the PD circuit 122 may be coupled between a positive voltage supply node 124 (VPOS of the PD circuit 122 and a negative voltage supply node 126 (VNEG). The PD 104 may include a capacitor 128 coupled between the positive voltage supply node 124 and the negative voltage supply node 126. The PD 104 may also include a capacitor 130 coupled between the positive voltage supply node 124 and a node 132, which may be coupled to a node 162. The node 162 may be coupled to a hot-swap output node (HSO), a source voltage node (VSS), and a control node (nSleep) of the PD circuit 122. The PD 104 may further include a detection resistor 131 (which may be an external precision detection resistor) coupled between the node 124 and an input node (RDET) of the PD 102.

The PD 104 may include a resistor 136 coupled between the positive voltage supply node 124 and a feedback node 138, and may include a resistor 140 coupled between the feedback node 138 and a negative voltage supply output node 142. The positive voltage supply node 124 and the negative voltage supply output node 142 may cooperate to provide an output voltage (Vout), which may provide power to associated circuitry. An output capacitor 144 may be coupled between the positive voltage supply node 124 and the negative voltage supply output node 142. The PD 104 may further include an inductor 146 coupled between a switching transistor output (SWO) 148 and the negative voltage supply output node 142. Further, the PD 104 may include a capacitor 150 coupled between a node 152 and the hot swap output (SWO) node 148. The node 152 may be coupled to a voltage supply node (VDD). The PD 104 may also include a diode 154 including an anode coupled to the node 148 and a cathode coupled to the positive voltage supply node 124.

In some embodiments, the PD 104 may include a capacitor 156 coupled between an error amplifier output node (EROUT) and a node 158. The PD 104 may include a resistor 160 coupled between the node 158 and a node 162, which may be coupled to the source voltage node (VSS). The PD 104 may also include a capacitor 164 coupled between the nodes 158 and 162. Further, the PD 104 may include a bypass transistor 133 including a first node 132, a second node 126, and a control node coupled to an external hot swap switch node (Exthsw).

In some embodiments, the PD circuit 122 may be configured to selectively provide an MPS signal of at least 10mA to the twisted pair cabling 106, when the PD circuit 122 is in a low duty-cycle or low-power mode or when the data processing circuitry 120 is in a low duty-cycle or low-power mode. In some embodiments, the PD circuit 122 may draw a current of at least 10mA, which may provide the MPS signal that can be detected by the PSE 102. In some embodiments, the PD circuit 104 may draw additional current and may provide a reply signal, which may be detected as the MPS signal.

In some embodiments, in a high power mode, the PD circuit 122 may apply a first signal to the control node of the bypass transistor 133 to selectively couple the node 132 to the node 126 through the transistor 133. In a low-power mode, the PD circuit 122 may apply a second signal to the control terminal of the bypass transistor 133 to selectively decouple the node 132 from the node 126. In the low-power mode, the PD circuit 122 may detect the power consumption level and may selectively generate the MPS signal for communication to the PSE device 102 so that the PSE device 102 does not turn off power to the PD 104.

Figure 2:
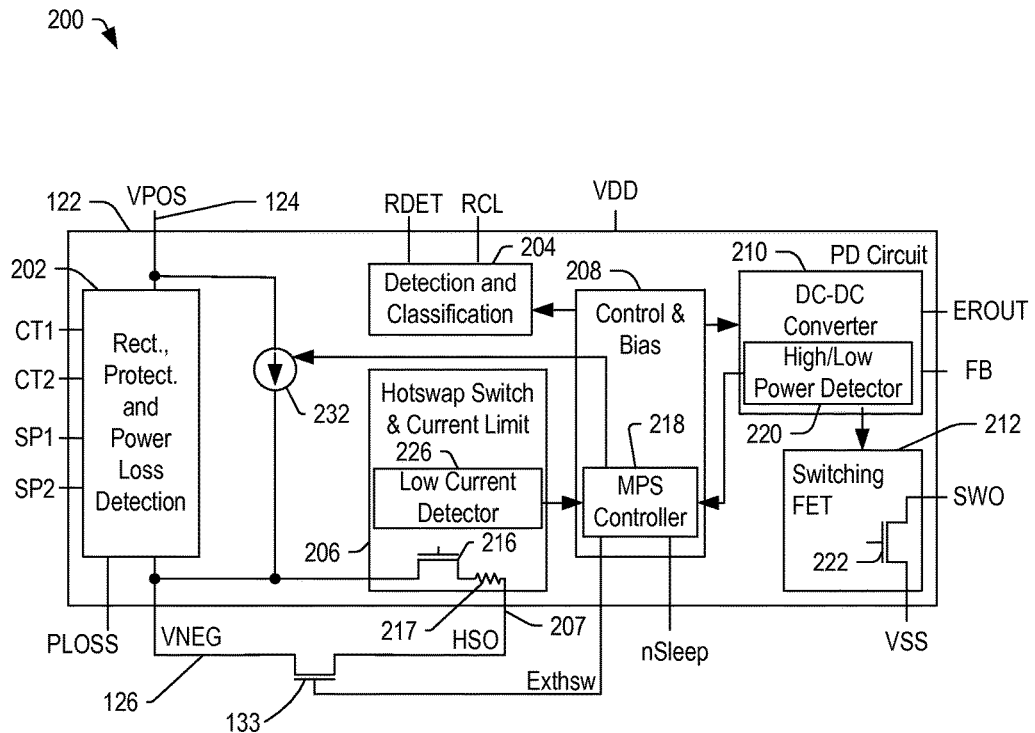
FIG. 2 is a block diagram of a PD device configured for low duty-cycle operation, in accordance with certain embodiments of the present disclosure.

FIG. 2 is a block diagram of a PD device 200 configured for low duty-cycle operation, in accordance with certain embodiments of the present disclosure. The PD device 200 may include the PD circuit 122. The PD circuit 122 may include rectification, protection and power loss circuitry 202, which may be coupled to the center taps of the transformer circuitry 118 in FIG. 1 via center tap nodes (CT1 and CT2) and which may be coupled to the RJ-45 connector via high-voltage supply input nodes (SP1 and SP2). The rectification, protection and power loss circuitry 202 may also be coupled between the positive voltage supply node (VPOS) 124 and the negative voltage supply node 126 (VNEG) (in FIG. 1).

The PD circuit 122 may further include a detection and classification circuit 204 coupled to the resistance detection input node (RDET) and to the classification input node (RCL). The detection and classification circuit 204 may respond to PD detection signals by providing a PD detection signature that may be detected by a PSE device 102 to determine the presence of a powered device. The detection and classification circuit 204 may also respond to PD classification signals by providing an appropriate PD classification signature, which may be detected by the PSE device 102 to determine the power requirements of the PD 104.

The PD circuit 122 may include a control and bias circuit 208 coupled to the detection and classification circuit 204 and coupled to a DC-DC converter 210. The hot swap control and common bias circuit 208 may include a maintain power signature (MPS) controller 218, which may be coupled to the control node (nSleep) and to an external hot swap switch node (Exthsw). Further, the control and bias circuit 210 may be coupled to a hot swap switch and current limit circuit 206. In some embodiments, the MPS controller 218 may be configured to control and optionally limit current to the output by controlling the hot swap switch and current limit circuit 206 via the external hot swap switch output (Exthsw). Further, the MPS controller 218 may provide a mode signal to the nSleep node during a startup process, which mode signal may control whether the MPS signal is generated automatically by the MPS controller 218 controlling a current source 232 coupled between the positive voltage supply node 124 and the negative voltage supply node 126, which may also provide a return current path to the twisted pair cabling 106 and the PSE device 102 (in FIG. 1).

The DC-DC converter 210 may be coupled to an error amplifier output node (EROUT) and to a feedback node (FB). The DC-DC converter circuit 210 may also be coupled to a switching field effect transistor (FET) 212, which may be coupled to the voltage supply node (VSS) and to a switch output node (SWO). The DC-DC converter 210 may include a high/low power detector 220, which may be configured to monitor the power output of the DC-DC converter 210 and to provide a signal indicating the power level to the MPS controller 218.

In some embodiments, the PD 200 may further include an external bypass transistor 133 including a source coupled to the hot swap switch and current limit circuit 206 via the hot swap switch output node (HSO) 207, a drain coupled to the rectification, protection and power loss detection circuit 202 via a negative supply voltage node (VNEG) 126, and a gate coupled to the control and bias circuit 208 via the external hot swap switch node (Exthsw).

In some embodiments, the PD circuit 122 may also include a low current detector circuit 226, which may be configured to measure the current in a low power consumption mode and to provide a detection signal to the MPS controller 218 when a current at the negative voltage supply node (VNEG) 126 is below a threshold current level, such as below 10mA. The low current detector circuit 226 may include or be coupled to a transistor 216 including a source coupled to the negative voltage supply node (VNEG) 126, a gate, and drain coupled to the hot swap output node 207 via a sense resistor 217.

In a low power mode, the MPS controller 218 may receive a signal indicating low power from the high/low power detector 220 and may deactivate the transistor 133 in response to the signal. The low current detector 226 or the MPS controller 218 may control the transistor 216 to enable current flow from the hot swap output node (HSO) 207 across the resistor 217, which may produce a voltage that can be compared against a reference voltage to determine if an MPS signal should be generated.

In some embodiments, in a high power consumption mode, the MPS controller 218 may provide a control signal to the gate of the bypass transistor 133 to couple the hot swap output node (HSO) to the negative voltage supply node (VNEG), reducing power consumption across the sense resistors of the MPS circuit 216. In a low power or low-duty cycle mode, the MPS controller 218 may deactivate the bypass transistor 133 to allow the MPS circuit 216 to measure current flow. Further, in some embodiments, the MPS controller 218 may selectively control the current source 232 to provide an MPS signal to the negative voltage supply node (VNEG) 126. In some embodiments, an external device, such as a host processor, may generate the MPS signal.

In certain embodiments, the PD device 200 of FIG. 2 may be an example implementation of the PD device 104 of FIG. 1. Further, in some embodiments, the MPS controller 218 and the MPS circuit 216 of the PD circuit 122 in FIG. 2 may be implemented in a variety of ways. In certain embodiments, the MPS circuit 216 may include both the MPS controller 218 and low current detection circuitry as discussed below with respect to FIG. 3.

Figure 3:
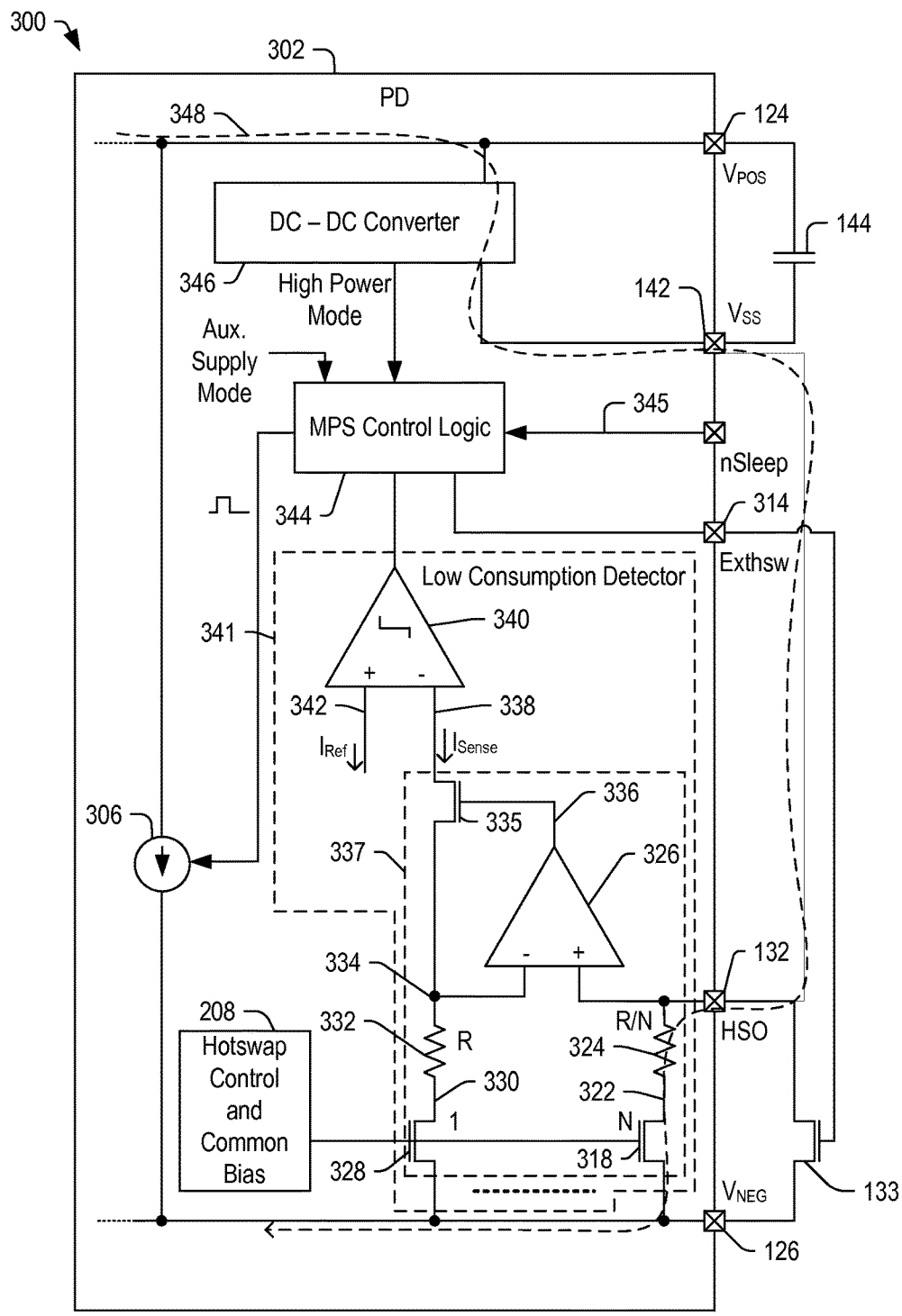
FIG. 3 is a diagram of a portion of a circuit of a PD device configured for low duty-cycle operation, in accordance with certain embodiments of the present disclosure.

FIG. 3 is a diagram of a portion of a circuit 300 of a PD device 302 configured for low duty-cycle operation, in accordance with certain embodiments of the present disclosure. The circuit 300 may be used within the PD circuits 122 of FIGS. 1 and 2. The circuit 300 may include an output capacitor 144 coupled between a positive (high) voltage supply node ($V_{POS}$) 124 and a negative (low) voltage supply node ($V_{SS}$) 142. In some embodiments, the low voltage supply node ($V_{SS}$) may be at a voltage potential that is positive but that is below the voltage potential of the positive voltage supply node ($V_{POS}$) 124. The PD device 302 may also include a bypass transistor 133 including a source coupled to a hot swap output node (HSO) 132, a gate coupled to an external hot swap switch node (Exthsw) 314, and a drain coupled to a negative (return) power supply node ($V_{NEG}$) 126.

The PD device 302 may include a current source 306 coupled between the positive voltage supply node (Vpos) 124 and the negative (return) power supply node ($V_{NEG}$)

126. Further, the PD device 302 may include a DC-DC converter 346 coupled to the positive voltage supply node ($V_{POS}$) 124 and to the low voltage supply node ($V_{SS}$) 142. The PD device 302 may also include MPS control logic 344 including an input coupled to the DC-DC converter 346, an input to optionally receive an auxiliary supply mode signal, and an input coupled to an MPS (low power) configuration node ($N_{SLEEP}$) 345. Further, the MPS control logic 344 may include an output coupled to the current source 306 and an input coupled to an output of a comparator 340 of a low consumption detector circuit 341.

The PD circuit 302 may include a transistor 318 including a source coupled to the negative (return) power supply node 126, a gate coupled to a control and bias circuit 208, and a drain coupled to the hot swap output node 132 through a resistor 324. The PD circuit 302 may further include a transistor 328 including a source coupled to the negative (return) power supply node 126, a gate coupled to the control and bias circuit 208, and a drain coupled to a node 334. The PD circuit 302 may further include an amplifier 326 including a first input coupled to the node 334, a second input coupled to the resistor 324 and the hot swap output node 132, and an output coupled to a node 336. The PD circuit 302 may further include a transistor 335 including a source coupled to the node 334, a gate coupled to the node 336, and a drain coupled to a node 338, which is coupled to a first input of the comparator 340. The comparator 340 may include a second input 342 to receive a reference current ($I_{REF}$) and an output coupled to the MPS control logic circuit 344.

In some embodiments, the resistance of the resistor 332 may have a resistance (R), and the resistance of the resistor 324 may be selected to be proportional to the resistance (R), such as R/N, where N is an integer, forming a ratio of one to N, where N may be selected to provide a desired sensitivity to low level currents at a first input of the amplifier 326. In a particular example, the resistor 332 may be larger than the resistor 324. In some embodiments, the resistor 324 and transistor 318 may be part of a resistance network including N resistors and N transistors, which may be selectively activated to provide a desired resistance.

In some embodiments, when the bypass transistor 133 is turned off, the control and bias circuit 208 may activate the transistors 328 and 318. In this instance, current may flow (as generally indicated by the dashed line 348) from the positive supply voltage node ($V_{POS}$) 124 through the DC-DC converter 346 and to the negative (low) supply voltage node ($V_{SS}$) 142. The current may flow to the hot swap output node 132, across the resistor 324 and through the transistor 318 to the negative supply voltage node ($V_{NEG}$) 126. The current flowing across resistor 324 may generate a voltage at the hot swap output node (HSO) 132. The amplifier 326 may receive the voltage at the hot swap output node (HSO) 132 and may receive a voltage at the node 334, which may be related to a sense current ($I_{SENSE}$) flowing across the resistor 332. The output of the amplifier 326 at the node 336 controls current flow through the transistor 335, allowing the sense current ($I_{SENSE}$) to flow across the resistor 332. The comparator 340 may compare the sense current ($I_{SENSE}$) at the node 338 to a reference current ($I_{REF}$) at the input 342. The output of the comparator 340 may be provided to the MPS control logic 344.

When the output of the comparator 340 indicates that the sense current ($I_{SENSE}$) is less than the reference current ($I_{REF}$), the MPS control logic 344 may generate a control signal to control the current source 306, which may cause the current source 306 to generate the MPS signal, such as a 10 mA current pulse. When the output of the comparator 340 indicates that the ISENSE current is greater than the reference current (IREF), the MPS control logic 344 may disable the MPS signal.

In some embodiments, the MPS control logic 344 may have multiple different operating modes, which may be controlled based on a signal at the node 345, during startup, during operation, or any combination thereof. In some embodiments, when the node 345 is coupled to ground or to a logic low voltage at startup, the MPS control logic 344 may be configured to automatically generate the MPS signal when the sense current ($I_{SENSE}$) falls below the reference current ($I_{REF}$). In some embodiments, when the node 345 is at a logic high level at startup, a host controller or processor coupled to the node VSS 142 may control generation of the MPS signal, such as by selectively drawing a 10 mA current pulse. In some embodiments, the host controller or processor may send a control signal across an isolation barrier, using, for example, a high frequency signal sent through a capacitor or providing an control signal to an opto-isolator circuit to communicate a control signal to the MPS control logic circuit 344. In this mode, if the voltage at the node 345 falls below a threshold level, the MPS control logic circuit 344 may assume control of the MPS signal generation by automatically control signals to the current source 306 to generate the MPS signal, until the voltage at the node 345 rises above the threshold.

In some embodiments, the transistor 318 may operate as a current sense transistor in the internal hot-swap switch transistor matrix. Using a closed-loop current sense circuit, including resistors 324 and 332 and including transistors 318, 328 and 335, a sense current ($I_{Sense}$) may be generated that may be proportional to the current consumption of the DC-DC converter 346. A current comparator 340 detects whether the power consumption of the DC-DC converter 346 is lower than the MPS generation limit (reference current, $I_{Ref}$). The MPS control logic circuit 344 may activate or deactivate the external bypass transistor 133 and may also generate control pulses for the internal MPS current generator (current source 306) based on the actual operation. In some embodiments, the DC-DC converter 346 may communicate power consumption data to the MPS control logic circuit 344, which may selectively activate the bypass transistor 133. In some embodiments, the MPS control logic circuit 344 may be configured to determine the sense current ($I_{Sense}$), and selectively control the current source 306 to provide an MPS signal when the power consumption data indicates a low power or low-duty cycle mode.

In some embodiments, the output node (Exthsw) 314 may have a logic high power level if the DC-DC converter 346 reports high power consumption. In the high power mode, the MPS control logic 344 may disable the MPS signal generation. When the external hot swap switch output node (Exthsw) 314 is at a logic low power level, the MPS control logic circuit 344 may selectively control the current source 306 to provide the MPS signal.

In some embodiments, if the DC-DC converter 346 reports low power consumption to the MPS control logic circuit 344 and if the configuration node 345 is coupled to the low power supply node 142 during startup, the MPS control logic circuit 344 may control the current source 306 to automatically generate the MPS signal based on the comparison of the sense current to the reference current. If the voltage at the configuration node 345 is at a logic high level during startup, the MPS control logic circuit 344 may allow the host processor 506 to control MPS signal generation. In some embodiments, the host processor 506 may communicate with the MPS control logic circuit 344 across an isolation barrier, such as a capacitor or an opto-isolator circuit. If the configuration node 345 is pulled to a logic low level, the MPS control logic circuit 344 may automatically generate MPS pulses to control generation of an MPS signal until the voltage at the configuration node 345 returns to a logic high level. In the mode where the configuration node 345 is at a logic high level during startup, the comparator 340, amplifier 326, and other circuit components of the low consumption detector circuit 341 may be ignored or disabled by the MPS control logic circuit 344. In an embodiment, if an auxiliary supply mode signal is received by the MPS control logic 344, at least one of the MPS control logic circuit 344 and the low consumption detector circuit 341 may be disabled.

In some embodiments, a powered device 104 may include a PD circuit, such as the PD circuit 122 of FIGS. 1 and 2 or the PD circuit 302 of FIGS. 3-5D. The PD circuit may include an MPS circuit (such as the low consumption detector 341), which may be configured to compare a sense current ($I_{Sense}$) to a reference current ($I_{REF}$) and, in a first mode, to automatically generate an MPS signal when the sense current is less than the reference current. In some embodiments, the power device may include a bypass transistor 133 including a gate coupled to the MPS circuit (via external hot swap switch node 314), a drain coupled to the hot swap switch output (HSO) node 132, and a source coupled to the supply node 126. In a high power mode, the MPS circuit may activate the bypass transistor 133 to shunt current detection circuitry (current sense detector circuit 337) of the MPS circuit. In a low power mode, the MPS circuit may deactivate the bypass transistor 133 such that current flows from the hot swap switch output (HSO) node 132 through the current detection circuitry (current sense detector circuit 337).

In some embodiments, the PD 104 may include a DC-DC converter 346 configured to provide a signal to the MPS circuit (such as MPS control logic circuit 344) indicating a power mode. The MPS control logic circuit 344 may determine one of the high power mode and the low power mode based on the signal.

In some embodiments, the PD circuit 122 may include a configuration node 345 coupled to the MPS circuit. In certain embodiments, the MPS control logic circuit 344 may be configured to automatically generate the MPS signal in response to the comparing when the configuration node 345 is coupled to ground (or to a relatively low voltage, such as a logic-low signal) during startup (i.e., a first mode). In certain embodiments, the MPS control logic circuit 344 may be configured to selectively generate the MPS signal when the configuration node 345 is at a voltage level other than ground during startup (i.e., a second mode). In some embodiments, the MPS control logic circuit 344 may be configured to operate in the second mode if the voltage level is at a logic high voltage level during startup. In certain embodiments, the MPS control logic circuit 344 may be configured to generate the MPS signal in response to control signals from a host processor (such as host processor 506 in FIG. 5A) when a voltage at the configuration node 345 is above a threshold voltage level and may be configured to automatically generate the MPS signal when the voltage at the configuration node 345 falls below the threshold voltage level and until the voltage rises above the threshold voltage level.

Figure 4:
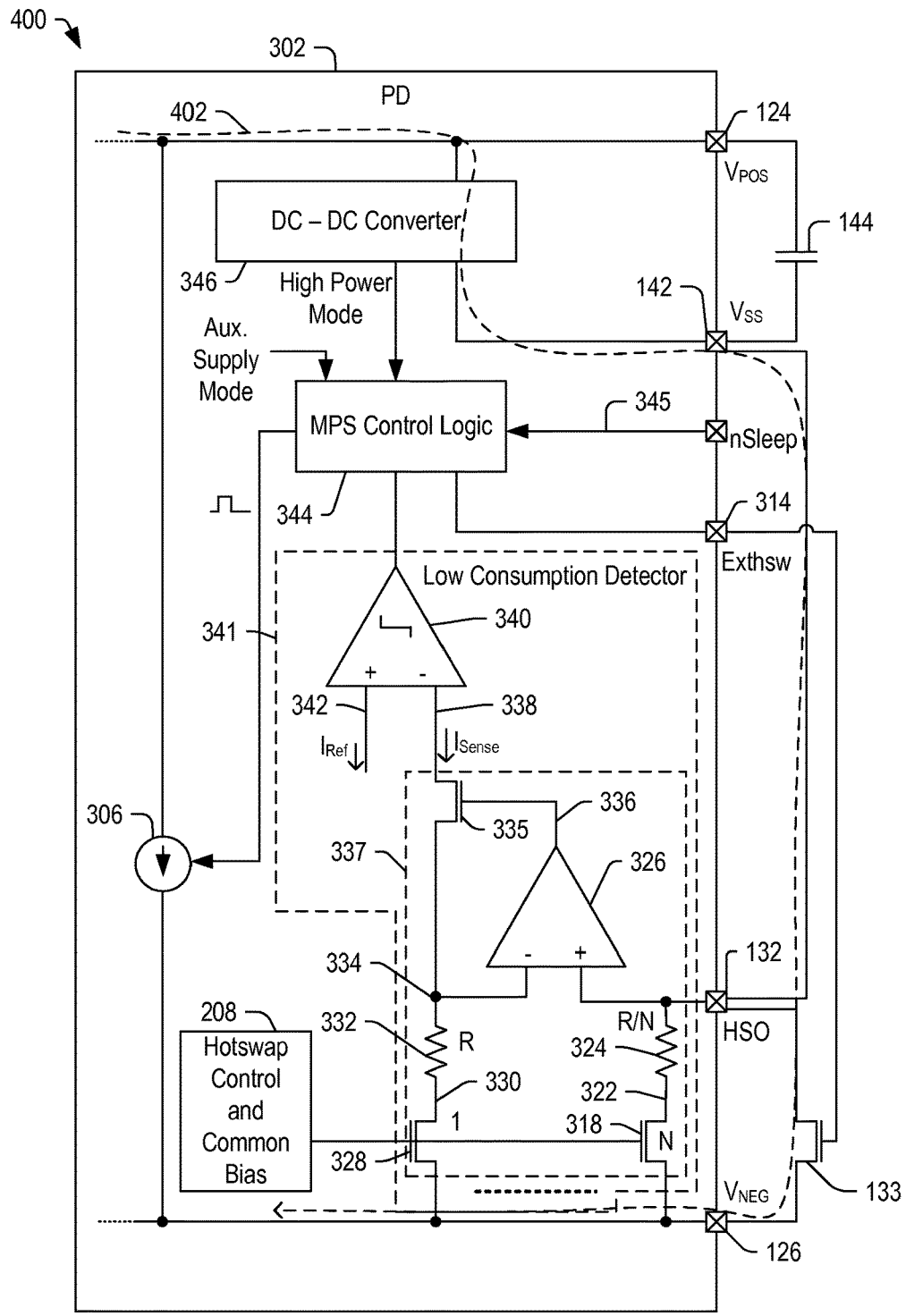
FIG. 4 is a diagram of the portion of the circuit of the PD device of FIG. 3 configured for high power operation, in accordance with certain embodiments of the present disclosure.

In still other embodiments, a PD may include a PD circuit, such as the PD circuit 122 in FIGS. 1 and 2 or the PD circuit 302 in FIGS. 3 and 4. The PD circuit 302 may include a low consumption detector circuit 337 configured to compare a sense current ($I_{SENSE}$) to a threshold current (reference current, $I_{REF}$) and to detect low power consumption when the sense current is less than the threshold current (reference current). The PD circuit 302 may further include an MPS control logic circuit 344 coupled to the low consumption detector 341 and configured to selectively generate an MPS signal in response to detecting the low power consumption. The PD device may further include a bypass transistor 133 configured to shunt the low consumption detector circuit 341 when the powered device 104 is in a high power consumption mode.

In certain embodiments, the low consumption detector circuit 341 may include a current sense circuit 337 coupled between a hot swap switch output node 132 and a power supply node 126. The current sense circuit 337 may be configured to generate the sense current ($I_{Sense}$) in response to a control signal, such as a signal from the control and bias circuit 208 to the gates of the transistors 328 and 318.

In certain embodiments, the bypass transistor 133 may include a first node coupled to the hot swap switch output node 132, a control node coupled to the MPS control circuit 344, and a second node coupled to the power supply node 126. The bypass transistor 133 may be configured to shunt the current sense circuit 337 in the high power consumption mode.

In some embodiments, the PD circuit 122 or 302 may include a configuration node 345 coupled to the MPS control circuit 344. The MPS control circuit 344 may be configured to determine a voltage at the configuration node 345 during startup to determine an MPS operating mode. In certain embodiments, when the voltage at the configuration node 345 is at a logic low level during startup, the MPS control circuit 344 may be configured to automatically generate the MPS signal. Otherwise, the MPS control circuit 344 may be configured to generate the MPS signal in response to a control signal from a host processor (such as host processor 506 in FIG. 5A) when the voltage at the configuration node 345 is above a threshold voltage. The MPS control circuit 344 may automatically generate the MPS signal when the voltage at the configuration node 345 falls below the threshold voltage and until the voltage rises above the threshold voltage. Other embodiments are also possible.

FIG. 4 is a diagram 400 of the portion of the circuit of a PD device 302 of FIG. 3 configured for high power operation, in accordance with certain embodiments of the present disclosure. In the illustrated example, the MPS control logic 344 may control the bypass transistor 133 to bypass the resistor 324 associated with the current sense detector 337. By activating the bypass transistor 133, the current follows a path (generally indicated at 402), which flows through the DC-DC converter 346, through node 142, and through transistor 133 to negative (return) power supply node 126. By bypassing the MPS current sense detector 337, overall power consumption is reduced, since current flows through the bypass transistor 133 to the return path, avoiding power dissipation in the sense resistor 324, which may present a large resistance relative to an impedance through the bypass transistor 133.

In some embodiments, the PD circuit 122 or 302 may include a first mode wherein the MPS control logic circuit 344 may be configured to automatically generate the MPS signal when the sense current is less than a reference current. In some embodiments, the PD circuit 122 or 302 may be configured to selectively provide the MPS signal in a second mode. In the second mode, the MPS control logic circuit 344 may allow a host controller or host processor to control generation of the MPS signal. In some examples, when a voltage at the configuration node 345 falls below a threshold voltage level during operation, the MPS control logic circuit 344 may resume automatic generation of the MPS signal, at least until the voltage at the configuration node 345 rises above the threshold.

FIG. 5A is a diagram of a portion of the circuit 500 of the PD device 302 including a configuration circuit 502 coupled to a configuration node 345 to configure generation of a maintain power signature signal, in accordance with certain embodiments of the present disclosure. The node 124 and the node 142 may be coupled to the capacitor 144 and to an isolation barrier circuit 503, such as a transformer. The isolation barrier circuitry 503 may be coupled to a load circuit 504, which may include a host processor 506. In some embodiments, the load circuit 504 (or coupling circuitry (e.g., isolation barrier circuitry)) between the load circuit 504 and the circuit 500 of the PD device 302 may include opto-isolator circuitry 508, and other circuitry to provide feedback and other functions without undermining the isolation provided by the isolation barrier circuitry 503.

In some embodiments, the configuration circuit 502 may control an operating mode of the circuit 500 with respect to MPS signal generation. In some embodiments, the configuration circuit 502 may configure the MPS signal generation at startup, for example, based on a voltage level of a signal presented via the configuration node 345 (e.g., logic high or logic low). In some embodiments, if the configuration circuit 502 may selectively alter a mode during operation. In some embodiments, if the DC-DC converter 346 reports low power consumption to the MPS control logic circuit 344 and if the node 345 is coupled to the low power supply node 142 during startup, the MPS control logic circuit 344 may be configured to automatically generate the MPS signal based on the comparison of the sense current ($I_{SENSE}$) to the reference current ($I_{REF}$).

FIG. 5B is a diagram of the portion 520 of the circuit 302 of FIG. 5A configured for automatic generation of the maintain power signature signal, in accordance with certain embodiments of the present disclosure. In the illustrated example, the configuration circuit 522 is configured to couple the node 345 to a low supply node 524, such as ground or a logic low supply voltage, during startup. In a particular example, when the configuration circuit 522 couples the configuration node 345 to a low supply voltage or ground during startup, the MPS control logic circuit 344 may be configured to automatically generate the MPS signal when the DC-DC converter 346 indicates low power consumption and when a sense current ($I_{SENSE}$) falls below a threshold reference current ($I_{REF}$). In some embodiments, the MPS control logic circuit 344 may automatically and always generate the MPS signal.

FIG. 5C is a diagram of the portion 540 of the circuit 302 of FIG. 5A configured for selective generation of the maintain power signature signal, in accordance with certain embodiments of the present disclosure. In the illustrated example, the configuration circuit 542 may be configured to selectively couple the configuration node 345 to a low supply voltage (VSS) or to another voltage via a transistor 544. In some embodiments, the transistor 544 may be a bipolar junction transistor (BJT).

In some embodiments, if the voltage at the configuration node 345 is at a logic high level during startup, the host processor 506 may control MPS signal generation, for example, using an opto-isolator circuit, such as a light emitting circuit 546 configured to emit light 545 toward the transistor 544 in response to control signals from the host processor. The emitted light 545 may cause the transistor 544 to selectively conduct current, which current may be detected by the MPS control logic circuit 344, causing the MPS control logic circuit 344 to selectively generate the MPS signal in response to the control signals. If the configuration node 345 is pulled to a logic low level, the MPS control logic circuit 344 may automatically generate MPS pulses to produce an MPS signal until the voltage at the configuration node 345 returns to a logic high level. In the mode where the node 345 is at a logic high level at startup, the comparator 340, amplifier 326, and other circuit components of the low consumption detector circuit may be ignored by the MPS control logic circuit 344.

FIG. 5D is a diagram of the portion 560 of the circuit 302 of FIG. 5A configured for selective generation of the maintain power signature signal, in accordance with certain embodiments of the present disclosure. In the illustrated example, the configuration circuit 562 may include a transistor 544, which may have a first node coupled to the configuration node 345, a second node coupled to a low voltage supply, such as ground, and a control node coupled to a host processor 506 through a capacitor 564 or other isolation circuit. Other embodiments are also possible.

Figure 6:
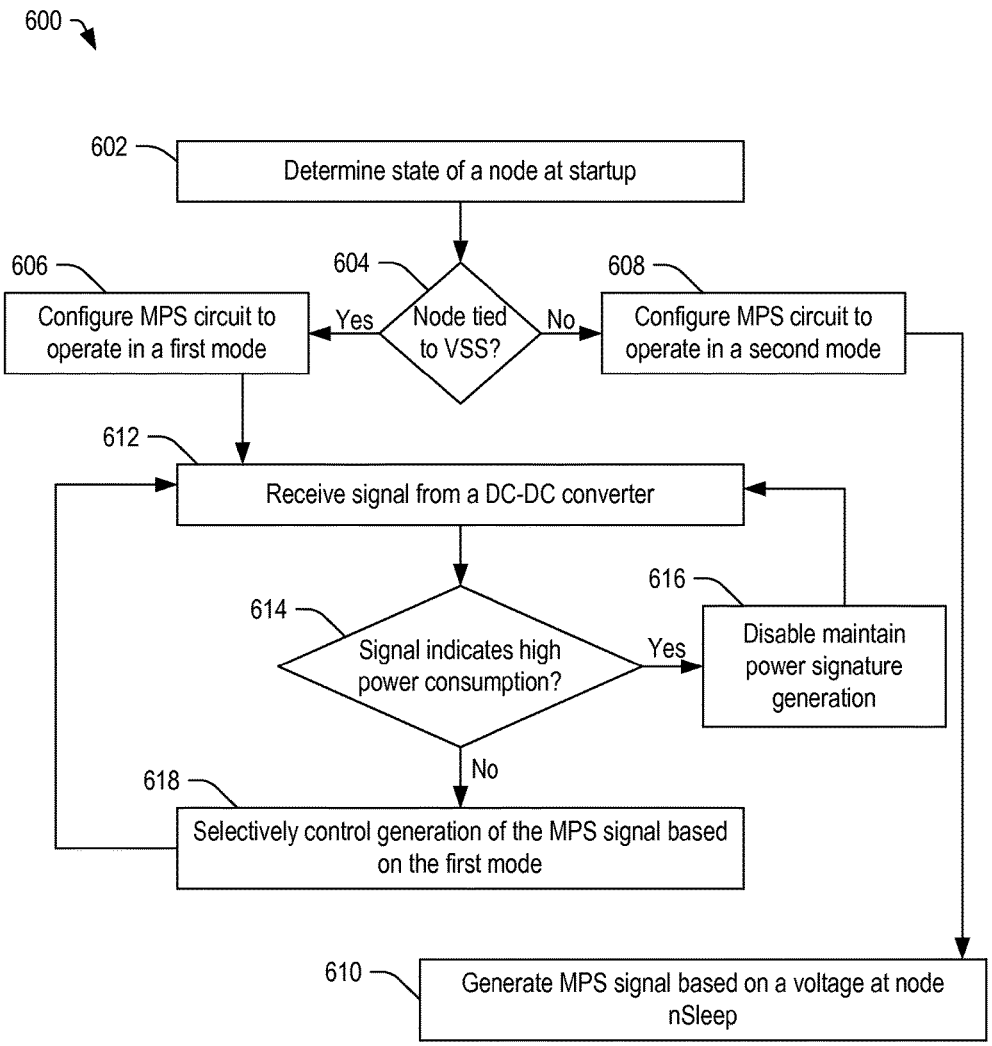
FIG. 6 is a flow diagram of a method of generating a maintain power signature signal, in accordance with certain embodiments of the present disclosure.

FIG. 6 is a flow diagram of a method 600 of generating an MPS signal, in accordance with certain embodiments of the present disclosure. The method 600 may include determining a state of a node during startup, at 602. In some embodiments, determining the state may include determining a voltage at the node during a startup routine. In some embodiments, determining the state may include checking a voltage at a configuration node or checking a setting in a programmable register. At 604, if the node is not tied to the low voltage supply at startup, the method 600 may include configuring the MPS circuit to operate in a second mode, at 608. In some embodiments, the second mode may include selectively allowing a host processor to control MPS signal generation when a voltage at the node is above a threshold. The host processor may control the MPS signal generation by sending optical or high frequency control signals to the PD circuit across an isolation barrier. In the second mode, the MPS control logic circuit 344 may automatically generate the MPS signal via the MPS circuitry when the voltage at the node falls below the threshold and until the voltage rises above the threshold. In the example, the MPS control logic circuit 344 may resume control the MPS signal generation when the voltage at the configuration node 345 falls below a threshold voltage level. The method 600 may include generating the MPS signal based on the voltage at the node nSleep, at 610. In the second mode, the PD may allow a host processor to control the MPS signal generation, when the sense current is below the reference current. In the second mode, if a voltage at the node falls below a threshold voltage level, the MPS control logic circuit 344 of the PD may assume control of the MPS signal generation, automatically generating the MPS signal until the voltage rises above the threshold voltage level, at which point the MPS control logic circuit 344 may hand control to the host processor to resume control of the MPS signal generation.

Returning to 604, if the node is tied to a low voltage supply (VSS) during startup, the method 600 continues to 606 and the MPS circuit may be configured to operate in a first mode. In some embodiments, the first mode may include automatic MPS signal generation when the MPS detector circuit detects low power consumption of a DC-DC converter or low-duty cycle operation of a load circuit.

At 612, the method 600 may include receiving a signal from a DC-DC converter. The signal may include an indication of the power consumption of the DC-DC converter. At 614, if the signal indicates high power consumption, the method 600 may include disabling the maintain power signature generation, at 616. In some embodiments, if the DC-DC converter is consuming power at a relatively high level, the current consumption by the PD may be high enough that the PSE device will not turn off power to the device. In some embodiments, the MPS control logic circuit 344 may disable the MPS signal generation, reducing overall power consumption. The method 600 may then return to 612 to receive another signal from the DC-DC converter.

Returning to 614, if the signal does not indicate high power consumption, the method 600 may include selectively controlling generation of the MPS signal based on the first mode, at 618. In a first mode, the PD may automatically generate the MPS signal when the DC-DC converter signal indicates low power consumption and when a sense current from the PD is less than a reference current. The method 600 may then return to 612 to receive another signal from the DC-DC converter. Other operating modes are also possible.

Figure 7:
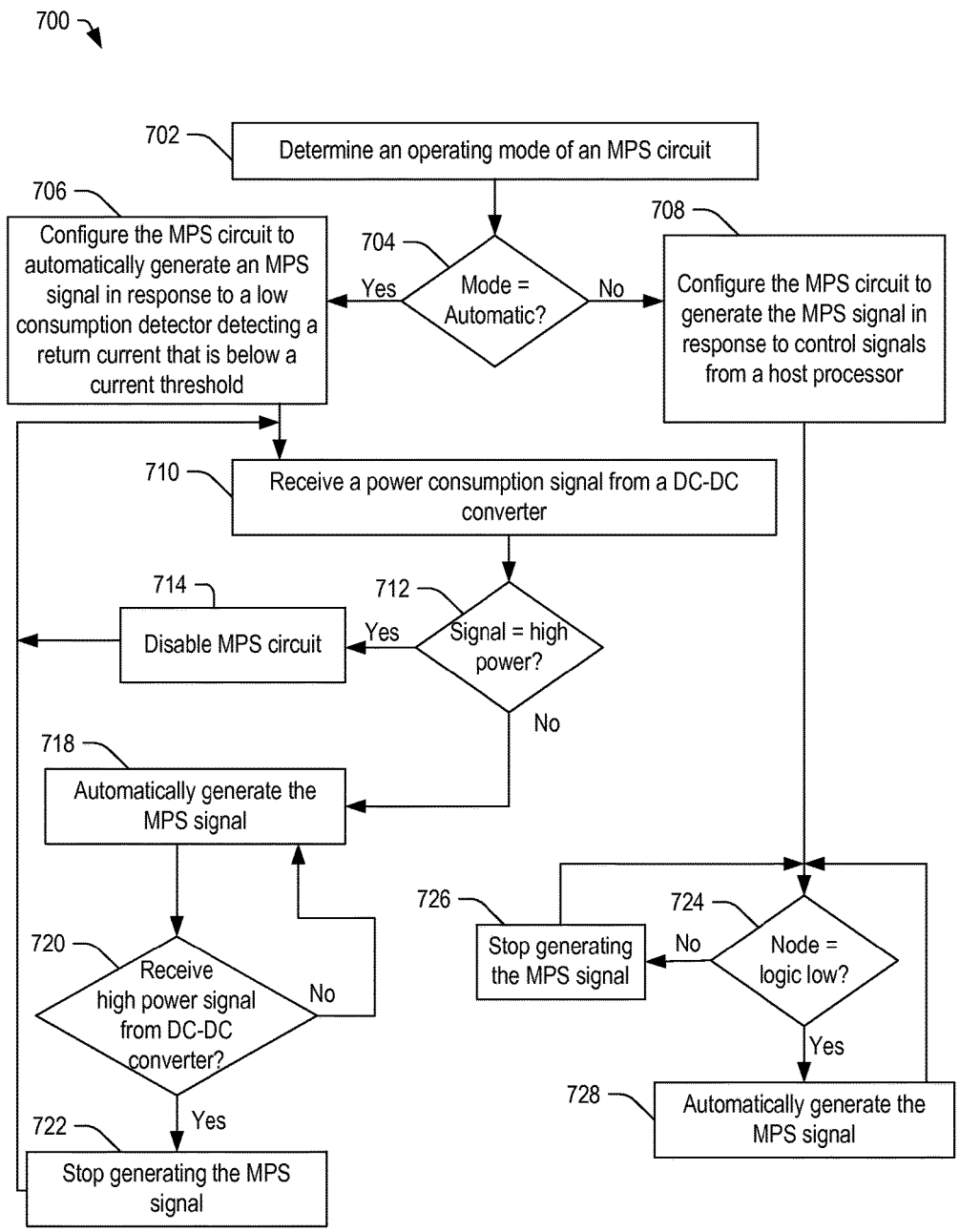
FIG. 7 is a flow diagram of a method of generating a maintain power signature signal, in accordance with certain embodiments of the present disclosure.

FIG. 7 is a flow diagram of a method 700 of generating an MPS signal, in accordance with certain embodiments of the present disclosure. At 702, the method 700 may include determining an operating mode of an MPS circuit during startup or during a configuration operation. At 704, if the mode is not automatic, the method 700 may include configuring the MPS circuit to generate the MPS signal in response to control signals from a host processor, at 708. In some embodiments, the host processor may be electrically isolated from the PD circuitry and from the MPS circuit (such as by a transformer circuit) and may communicate control signals using an opto-isolator circuit, which may be configured to emit light toward a base of a transistor to produce the control signals across the isolation barrier or via a capacitor by sending a high frequency signal. The method 700 may then determine if the node is at a logic low level, at 724. If not, the method 700 may include stopping generation of the MPS signal, at 726. Otherwise, if the node is at a logic high level at 724, the method 700 may include automatically generating the MPS signal 728.

Returning to 704, if the operating mode is "automatic," the method 700 may include configuring the MPS circuit to automatically generate an MPS signal in response to a low consumption detector detecting a sense current that is below a reference current, at 706. In some embodiments, if the low consumption detector detects a "low" sense current, the MPS circuit may automatically generate the MPS signal. In some embodiments, the MPS circuit may control a current source to generate the MPS signal.

At 710, the method 700 may include receiving a power consumption signal from the DC-DC converter. The power consumption signal may include a voltage level, a digital word, or other indicator of the power consumption level of the DC-DC converter. At 712, if the DC-DC converter provides a power consumption signal indicating "high power," the method 700 may include turning off or disabling the MPS circuit, at 714. The method 700 may then return to 710 to receive another power consumption signal.

Returning to 712, if the DC-DC converter provides a low power consumption signal indicating "low power," the method 700 may automatically generate the MPS signal, at 718. If, at 720, a power consumption signal indicating "high power" is received from the DC-DC converter, the method 700 may include stopping generation of the MPS signal, at 722. The method 700 may then return to 710 to receive another power consumption signal. Otherwise, at 720, if the power consumption signal does not indicate that a high power signal is received, the method 700 may return to 718 to automatically generate the MPS signal.

In conjunction with the systems, methods, and circuits described above with respect to FIGS. 1-7, a powered device may include MPS generation circuitry that may operate in selected operating modes. Further, the powered device may include a low resistance on (r-ON) bypass transistor configured to selectively shunt an internal hot-swap switch coupled to the MPS generation circuitry, when the PD is in high power mode. When the PD is in a low power mode, the bypass transistor may be turned off to allow the internal hot-swap transistor(s) to couple sense resistors to an amplifier to measure the current consumption via a relatively high impedance. Thus, embodiments of a powered device may be capable of determining whether to generate the MPS signal in a low-power mode, while maintaining low power consumption and high efficiency in high power mode.

Although the present invention has been described with reference to preferred embodiments, workers skilled in the art will recognize that changes may be made in form and detail without departing from the scope of the invention.

What is claimed is:

1. A powered device comprising:
 a powered device circuit including:
   a configuration node;
   a maintain power signature (MPS) circuit coupled to the configuration node, the MPS circuit including a low consumption detector circuit configured to compare a sense current to a reference current and, in a first mode, to automatically generate an MPS signal when the sense current is less than the reference current, the MPS circuit configured to selectively generate the MPS signal, in a second mode, when the configuration node is at a logic high voltage level during startup, in the second mode, the MPS circuit configure to:
     generate the MPS signal in response to control signals from a host processor when a voltage at the configuration node is above a threshold voltage level; and
     automatically generate the MPS signal when the voltage falls below the threshold voltage level and until the voltage rises above the threshold voltage level; and
   a bypass transistor configured to shunt the low consumption detector circuit when the powered device is in a high power consumption mode.

2. The powered device of claim 1, further comprising the bypass transistor including a gate coupled to the MPS circuit, a drain coupled to a hot swap switch output node, and a source coupled to a supply node; and
 wherein:
   in a high power mode, the MPS circuit activates the bypass transistor to shunt current detection circuitry of the MPS circuit; and
   in a low power mode, the MPS circuit deactivates the bypass transistor such that current flows from the hot swap switch output node through the current detection circuitry.

3. The powered device of claim 2, further comprising:
 a direct current (DC) to DC converter configured to provide a signal to the MPS circuit; and
 wherein the MPS circuit determines one of the high power mode and the low power mode based on the signal.

4. The powered device of claim 1, wherein, in the first mode, the configuration node is coupled to a first power supply node during startup.

5. A method comprising:
   determining a power consumption state of a direct-current (DC) to DC converter;
   disabling generation of a maintain power signature (MPS) signal when the power consumption state corresponds to high power consumption by activating a bypass transistor to shunt current detection circuitry of the MPS circuit; and
   selectively providing the MPS signal to a power supply node in response to a configuration state of an MPS circuit when the power consumption state corresponds to low power consumption, selectively providing the MPS signal including:
      generating the MPS signal in response to control signals from a host processor when the signal at the configuration node is above a threshold;
      automatically generating the MPS signal when the signal falls below the threshold; and
         continuing to automatically generate the MPS signal until the signal rises above the threshold;
   wherein, before determining the power consumption state, the method further comprises determining, during startup, the configuration state of the MPS circuit based on a signal at a configuration node of the MPS circuit; and
   configuring the MPS circuit to selectively generate the MPS signal when the signal at the configuration node corresponds to a logic high voltage during startup.

6. The method of claim 5, further comprising configuring the MPS circuit to automatically generate the MPS signal when the signal at the configuration node during startup corresponds to a logic low voltage.

7. The method of claim 5, wherein determining the state of the DC-DC converter comprises receiving, at the MPS circuit, a power consumption signal from the DC-DC converter.

8. The method of claim 5, further comprising disabling generation of a maintain power signature (MPS) signal in response to receiving an auxiliary power supply signal.

9. A powered device comprising:
   a powered device circuit including:
   a low consumption detector circuit configured to compare a sense current to a threshold current and to detect low power consumption when the current is less than the threshold;
   a maintain power signature (MPS) control circuit coupled to the low consumption detector and configured to selectively generate an MPS signal in response to detecting the low power consumption;
   a bypass transistor configured to shunt the low consumption detector circuit when the powered device is in a high power consumption mode; and
   a configuration node coupled to the MPS control circuit, the MPS control circuit configured to determine a voltage at the configuration node during startup to determine an MPS operating mode.

10. The powered device of claim 9, wherein the low consumption detector circuit includes a current sense circuit coupled between a hot swap switch output node and a power supply node, the current sense circuit configured to generate the sense current in response to a control signal.

11. The powered device of claim 10, wherein the bypass transistor:
   includes a first node coupled to the hot swap switch output node, a control node coupled to the MPS control circuit, and a second node coupled to the power supply node; and
   is configured to shunt the current sense circuit in the high power consumption mode.

12. The powered device of claim 9, wherein:
   when the voltage at the configuration node is at a logic low level during startup, the MPS control circuit is configured to automatically generate the MPS signal; and
   otherwise, the MPS control circuit is configured to:
   generate the MPS signal in response to a control signal from a host processor when the voltage at the configuration node is above a threshold voltage; and
   automatically generate the MPS signal when the voltage falls below the threshold voltage and until the voltage rises above the threshold voltage.

\* \* \* \* \*